2,836,487

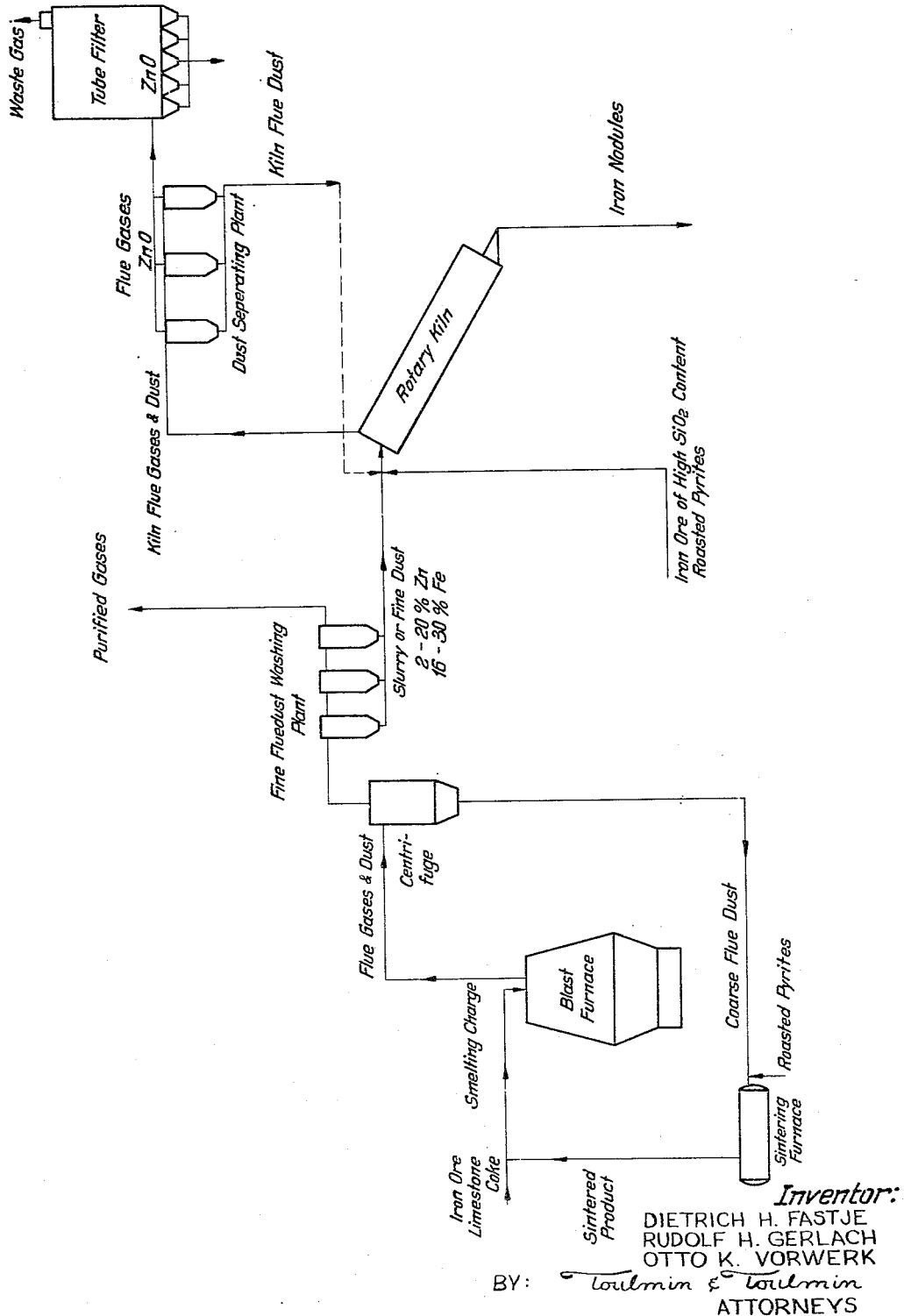
May 27, 1958  D. H. FASTJE ET AL  2,836,487
PROCESS FOR THE SEPARATION OF IRON FROM OTHER METALS
ACCOMPANYING IRON IN ORES OR WASTE MATERIALS
Filed Jan. 31, 1956
Inventor:
DIETRICH H. FASTJE
RUDOLF H. GERLACH
OTTO K. VORWERK
BY: Toulmin & Toulmin
ATTORNEYS

# United States Patent Office 2,836,487
Patented May 27, 1958

PROCESS FOR THE SEPARATION OF IRON FROM OTHER METALS ACCOMPANYING IRON IN ORES OR WASTE MATERIALS

Dietrich H. Fastje, Hannover, and Rudolph H. Gerlach and Otto K. Vorwerk, Rheinhausen, Germany, assignors to Aktiengesellschaft für Unternehmungen der Eisen- und Stahlindustrie, Essen, Germany Application January 31, 1956, Serial No. 562,544

Claims priority, application Germany January 31, 1955

9 Claims. (Cl. 75—41)

This invention relates to a new process for the separation of iron from other metals accompanying iron in ores or waste materials, which accompanying metals are volatilized during the reduction of the iron.

It is an object of our invention to provide a process for separating the iron from other metals accompanying iron in ores or waste materials in such a manner that the iron, as well as such other metals, particularly lead and zinc, can be obtained economically.

It is further object of our invention to provide a new process for obtaining iron and such volatilizable metals as lead and zinc accompanying the iron, thereby avoiding detrimental influences due to the presence of lead or zinc in the ores, on the course of the process and the installation for the same.

It is another object of our invention to provide a new process permitting the use of a blast furnace for obtaining iron and volatilizable metals such as zinc, lead, cadmium, germanium, thallium and the allotropic modifications of metallic nature of selenium and tellurium accompanying the iron in quantities up to 10% of the iron-containing ore.

It is a still further object of our invention to provide a process of the above-stated nature which can be carried out as a closed cycle of steps so directed that the losses of iron and other metals are kept low without requiring any costly preliminary treatments.

It is finally an object of our invention to provide a new continuously operating process for separating iron and volatilizable metals accompanying iron in ores and waste materials from one another.

It is well known in the art of producing iron that many iron ores and, in particular, fine ores, can not be economically processed and render the optimum profits, because of the drawback that these ores contain volatilizable metals accompanying the iron such as, for instance, lead and zinc. On the one hand, these ores are undesirable or can not be used as charge components for blast furnaces in the production of iron, since the accompanying metals unfavorably influence the process in the blast furnace.

For instance, zinc, as an accompanying metal, accumulates in the flue dust. Therefore, when the latter is sintered or briquetted to convert the dust to lumps which are then reintroduced into the blast furnace cycle, this will lead to an increase in the zinc content of the smelting charge which, in turn, results in disturbances in the blast furnace process, for instance, by deposits formed in the shaft or at the gas outlet or flue at the top of the furnace. It is, however, preferred, from an economic viewpoint, in the art of making iron in a blast furnace to return the entire flue dust and slurries obtained from the latter to the blast furnace. It has, therefore, generally been considered undesirable and disadvantageous to smelt ores containing more than 2% zinc and/or other volatilizable metals in the furnace without unduly shortening its life time. On the other hand, the content of lead and zinc in these ores is in most cases too low to warrant an economical processing of these ores for the purpose of producing these metals alone without obtaining at the same time the iron contained therein.

Our present invention provides for the processing of the aforesaid kind of ores and for obtaining iron as well as the volatilizable metals such as lead and zinc accompanying the iron in the ores, in an economical manner while avoiding the above-described effects on the course of the process in the blast furnace or on the blast furnace itself. This is achieved by carrying out, in the process according to the invention, the separation of iron from the volatilizable metals accompanying iron in the ores or in iron containing waste materials in two steps, the first step comprising smelting the ores and/or waste materials in the blast furnace under reduction to pig iron, and the second step of reducing the flue dusts from the blast furnace and flue sludge that can be obtained from these dusts by various known processes, which dusts and sludge contain a portion of iron as well as the volatilizable metals, in a rotary kiln whereby the iron compounds are reduced to iron and the volatilizable metals are obtained from the gases released during the second step by a number of further steps known per se.

It is an advantage of our new process that the treatment of the flue dust, having a high zinc content, in a rotary kiln subsequent to the smelting step in the blast furnace makes it possible to smelt even roasted pyrites containing up to 8–10% of zinc in limited quantities in the blast furnace.

In the first step of our process which is carried out in the blast furnace, the major part of the iron contained in the ore is converted to pig iron and removed from the process, while a minor portion of the iron is transferred to the flue dusts or to the sludge obtained from the flue gases, depending upon the methods employed for purifying the flue gases. The aforesaid flue dusts or flue sludge derived from the blast furnace process contain, apart from the above-mentioned small quantity of iron, substantially all lead and zinc originally contained in the ores as well as carbon in quantities not exceeding a few percent which are derived from the blast furnace leaving the same with the flue gases in the form of fine coke dust.

The second step of our process comprises the reduction of the flue dust or flue sludge resulting from the first step, which reduction is carried out, for instance, according to the well known Krupp Direct Process, which consists in mixing the charge for this process with fine-grained reduction carbon and introducing the resulting mixture into a rotary kiln whereby solid iron in the shape of nodules is obtained.

The accompanying metals such as lead or zinc are volatilized in the rotary kiln and leave the same in the flue gases from which they are practically completely recovered in the form of their oxides. This recovery step is carried out in a manner well known in the art. It is, for instance, described in Victor Tafel's "Lehrbuch der Metallhüttenkunde," vol. II (1953), pp. 637–641. Subsequently, these metal oxides may be used to prepare pigments or for the production of the metals proper. The iron nodules obtained by this second process step in the rotary kiln can be returned to the blast furnace to be incorporated in the charge for a new process step. It is also of advantage to add to the flue dusts or flue sludges obtained from the flue dusts difficulty reducible materials such as roasted pyritic materials, purple ore, and the like, and then process the resulting mixture in the rotary kiln according to the second step of our process, as the reduction of the latter materials will be facilitated by the admixture of the more easily reducible dust or sludge. The generally relatively high calcium oxide content of sludges obtained from flue dusts makes it possible to apply the Krupp direct process to the treatment of waste materials from foundries, steel works, etc., which materials are rich in silicic acid. (The Krupp direct process is disclosed in Patents No. 1,964,917; 2,026,683; 2,709,650 and 2,721,794.) The CaO content of the flue dust is always so high that it is unsuited for obtaining the kind of slag required in a rotary kiln. Therefore, the admixture of materials such as roasted pyrites, which usually have a high content of silicic acid, is of advantage. If the roasted pyrites are not sufficiently rich in silicic acid to achieve the desired slag composition in the rotary kiln, a further admixture of ores rich in silicic acid is required. On the other hand, if the materials admixed to the flue dust are so rich in silicic acid that the slag composition in the rotary kiln would have too low a CaO content, the addition of further calcium oxide is required.

In a further modification of the process according to our invention, when the iron content of the materials to be subjected to the second process step is low, i. e. below 20% Fe, we propose to add fine ores rich in iron content (about 40% Fe) to the charge in the rotary kiln in order to make this process step still more economical. For this purpose, we prefer to use iron ores having a relatively high content of silicic acid, if this should be required, in order to obtain a slag of a correspondingly siliceous composition, while we use ores of a more basic nature if otherwise the resulting slag would be too acid.

According to yet another modification of the process according to our invention, if the charge for the rotary kiln derived from the first step has too low a content of volatilizable metals such as lead or zinc, we use fine ores, either of acid or basic nature, having a relatively high content of such volatilizable metals as an addition to the charge for the second step of our process, thereby increasing the content of these volatilizable metals in the total charge to be subjected to our second process step, while at the same time influencing the composition of the resulting slag in the manner described above.

The volatilizable metals referred to in this process comprise, as has been mentioned above, lead and zinc, as well as cadmium, germanium, thallium, metallic modifications of selenium and tellurium.

A preferred embodiment of the process shall be described hereinafter in detail in the accompanying flow sheet. Step I is carried out in the blast furnace and step II in the rotary kiln. The blast furnace is charged with a smelting mix of roasted pyrites containing from 1% Zn and 60% Fe to 11% Zn and 43% Fe. In order to prepare the charge for the blast furnace the roasted pyrites and the coarser share of the dry flue dust from a preceding blast furnace operation are mixed and sintered in a sintering furnace. The coarse flue dust contains from about 0.3% zinc and 43% iron to 0.5% zinc and 38% iron. The sintered product is then crushed and mixed with iron ore containing from traces to about 0.5% of zinc, and with lime stone and coke, and the resulting smelting charge is introduced into the blast furnace.

The ratios of roasted pyrites to coarse flue dust in the sinter products may vary over a wide range as long as the total zinc content of the sinter products does not substantially exceed 10%. The ratio of the sinter products to the fresh iron ores and the other components in the smelting charge may equally vary over a wide range. A preferred ratio of sinter products to ores is from 1:1 to 1:3.

The flue gases and flue dust escaping from the blast furnace are introduced into a cyclone dust catcher in which the coarser particles of the flue dust containing from 0.3 to 0.5% Zn and from 38 to 43% Fe are separated from the finer flue dust containing from 2% Zn and 30% Fe to 20% Zn and 16% Fe.

The coarse flue dust is returned to the blast furnace. The fine flue dust is passed through a washing plant from which the purified gases escape for eventual use as heating gas, while the flue dust is converted into a slurry of the same zinc and iron content as the aforementioned fine flue dust.

If a dry purification plant, such as a filter, is used for purifying the flue gas, the fine flue dust is retained in a dry state.

The slurry or fine dust is mixed with roasted pyrites having a high zinc content, in the order of 1 to 11% and an iron content from 43 to 60%, as well as iron ore having a high content of $SiO_2$ for regulating the composition of the resulting slag. Iron ores containing CaO and $SiO_2$ in a ratio below 3:10 may be considered as having a high content of silicic acid. The ratio of roasted pyrites to flue dust (or flue slurry) is, for instance, in the order of 10:6 to 10:12. However, these ratios are not particularly critical. In a preferred example to be described hereinafter in detail we use a ratio of flue dust to pyrite of 1:1 in the kiln charge. The amount of iron ore of high silicic acid content depends upon the degree of acidity desired in the slag obtained from the kiln and on the exact $SiO_2$ content of the ore. In the examples described hereinafter we use a content of ore in the charge amounting to 8–10%.

The entire content of volatilizable metals leaves the rotary kiln with the flue gases of the latter, mainly in the form of metal oxides. The flue gases and dust from the rotary kiln are subjected to a separation in a dust separating plant. The kiln flue dust contains about 15 to 30% Zn and may be returned to the rotary kiln. The oxides of the volatilizable metals which consist mainly of zinc oxide having a content of Zn greater than 50% are passed together with the flue gases through a tube filter in which the zinc oxide is deposited in the form of a powder containing approximately 70% ZnO. The recovery of lead and other volatilizable metals is carried out in the same manner.

The process according to our invention is further illustrated by the following examples:

Example 1

*Step I.*—A smelting charge for the blast furnace is prepared for obtaining a smelt of 1000 kilograms of pig iron. This charge has the following composition:

535 kg. sinter products, consisting of 1 part of roasted pyrites and 2 parts of coarse flue dust
811 kg. Swedish ore with about 0.05% Zn
632 kg. German ore containing traces of Zn
64 kg. scrap iron
220 kg. limestone
229 kg. coke The zinc content of the flue dust used for the sintered products is 0.3%, the iron content 43%. The remaining components of the flue dust are coke dust and slag particles.

The roasted pyrites used contain 0.20% Zn and about 60% Fe, and slag.

The reduction of the smelting charge in the blast furnace is carried out in a conventional manner and under conditions of temperature etc. commonly known in the art. The composition of the resulting pig iron is also conventional.

The first step of the process yields:

1000 kg. pig iron
793 kg. slag
101 kg. coarse flue dust
91 kg. flue dust slurry
11 kg. waste pig iron The coarse flue dust containing about 0.4% Zn is returned to the blast furnace, the flue dust slurry, rich in zinc and other volatilizable metals, is used in the second step of the process.

*Step II.*—The charge for the rotary kiln is prepared from flue dust slurry, German ore and roasted pyrites. The composition of each of these materials is determined by analysis to be the following:

|  | Percent Fe | Percent Zn | Percent C | Percent $SiO_2$ | Percent $Al_2O_3$ | Percent CaO | Percent MgO | Percent Mn | Percent S | Percent P | Percent $H_2O$ |
|---|---|---|---|---|---|---|---|---|---|---|---|
| Flue Dust Slurry | 29.5 | 2.1 | 8.7 | 13.6 | 5.1 | 11.1 | 2.8 |  |  |  | 20 |
| German Ore | 36.3 | traces |  | 43.25 | 1.47 | 0.90 | 0.26 | 0.10 | 0.015 | 0.19 | 6.6 |
| Roasted Pyrites | 43.4 | 10.6 |  | 14.95 | 4.13 | 2.7 | 0.87 |  | 0.71 | 0.035 | 6.2 |

These materials are mixed to obtain a charge composed of:

53 parts by dry weight of roasted pyrites
37 parts by dry weight of flue dust slurry
10 parts by dry weight of German ore having only traces of zinc 29 parts of fine-grained coke having a particle size below 4 millimetres are admixed to the composition. The rotary kiln is heated with coal dust. The amount of heating fuel required is equal to about 7% of the dry weight of the charge. The temperature in the hottest zone of the kiln is maintained at about 1250° C. The iron nodules obtained by the second step have the following average composition:

| Fe | S | P | C | Slag Components |
|---|---|---|---|---|
| Percent 94.12 | Percent 0.92 | Percent 0.68 | Percent 0.42 | Percent 2.76 |

The amount of iron produced by this process corresponds to a rate of yield of 94%, the yield of zinc is 97.7%.

*Example 2*

In step I a charge for the production of 1000 kg. of pig iron is prepared in the same manner as in Example 1. The content of zinc from the flue dust in the sintered product is 0.5%, the iron content of the same 38%. The roasted pyrites used for preparing the sintered product contain 3% of zinc and about 56% of iron. The amounts of products obtained by the first step of this process are not substantially changed.

In step II the charge for the rotary kiln has the following composition:

55 parts by dry weight of roasted pyrites
26 parts by dry weight of flue dust slurry
9 parts by dry weight of German ore, containing only traces of zinc The treatment of this mixture in the rotary kiln is substantially identical with that of Example 1. The amount of iron produced corresponds to a rate of yield of 91.5%, that of zinc to 98.1%.

*Example 3*

Step I is carried out in the same manner and with the same quantities of materials as in Example 1.

In step II the charge for the rotary kiln is composed of 50 parts of roasted pyrites and 50 parts of flue dust slurry; no iron ores are added to the composition. 28 parts of fine-grained coke are added to the charge, the consumption of fuel being about 6% of the total dry weight of the charge. The iron nodules obtained from the kiln have the following average composition:

| Fe | S | P | C | Slurry Components |
|---|---|---|---|---|
| Percent 92.79 | Percent 1.06 | Percent 0.65 | Percent 0.38 | Percent 4.57 |

The amount of zinc obtained by this step corresponds to a rate of yield of 98%, the amount of iron to a yield rate of 92%.

The process according to our invention makes it possible to separate iron and the volatilizable metals accompanying iron and waste materials containing iron from one another in a continuous operation while at the same time profitably exploiting the presence of unconsumed carbon in the flue dust and flue sludge for the reduction process. Furthermore, we succeed, by the process according to our invention, in favorably complementing the various raw materials in the process by other components to obtain a balanced charge in which (a) The low content of metals in the flue dust or flue sludge is increased by the addition of waste materials from foundries, steel works, and the like to a level making the entire process economically profitable; and (b) A calcium oxide content above normal in the sludge obtained from the flue dusts permits the application of the Krupp direct process even to foundry waste materials rich in silicic acid, because a favorable ratio of the components in the resulting slag is hereby obtained without substantially impairing the iron output or consequently raising the cost of the process.

The process according to our invention is therefore suitable for making those iron and metal production methods more economical in which waste materials of the nature described as being adapted for use in this process are a final or intermediary product. The process according to the invention can be applied to processes of the aforesaid kind as a part of a cycle of operation, thereby reducing the losses of iron and accompanying metals in the total cycle without requiring costly preliminary steps of processing. The rates of production of iron and the accompanying metals can be so adapted to each other in the total cycle of operation that the highest degree of economy possible is achieved.

Apart from the above-described advantages, the two-step process according to our invention offers the further advantage that the finely divided portion in the ores to be used for the process need not be converted to a coarser form for introduction into the blast furnace step, but can be introduced directly in its finely divided form into the second step.

Furthermore, slags, waste of burnt or roasted ore, waste from forgings, residues in the form of dust and similar waste material which cannot be used by themselves due to their chemical composition and/or their physical nature for processing either in a blast furnace or in a rotary kiln, can now be processed by introducing them at a suitable moment into the process according to our invention.

When applying the process according to our invention in connection with a blast furnace operation, it now becomes possible to process in the blast furnace ores and waste materials which contain, apart from the iron, volatilizable non-ferrous metals, in particular lead and zinc, in a considerably higher proportion than was hitherto possible without suffering any loss of iron or accompanying metals, or shortening unduly the lifetime of the blast furnace, and consequently with increased economic benefits. It is also an advantage of the new process that subsequent processing of the flue dust obtained from the blast furnace treatment in a rotary kiln instead of returning the flue dust to the blast furnace process, leads to a substantially smaller development of gas escaping from the rotary kiln than is being developed in the blast furnace. This is due, at least partly, to the fact that a much smaller quantity of flue dust is being processed in the rotary kiln as compared with the large amount of ores treated in the blast furnace. It is evidently much simpler to recover the volatilizable metals from the smaller kiln gas volume rather than from the large volume of blast furnace top gas.

It will be understood that this invention is susceptible to modification in order to adapt it to different usages and conditions and, accordingly, it is desired to comprehend such modifications within this invention as may fall within the scope of the appended claims.

We claim:

1. A process for separating iron from metals accompanying iron in ores and waste materials, which accompanying metals are volatilizable during the reduction of iron, comprising a first step of smelting the ores and waste material in a blast furnace to form pig iron, and a second step of reducing a charge comprising the flue dusts from said blast furnace step and sludge obtained from said flue dusts, in a rotary kiln, said flue dusts and sludge containing compounds of iron as well as of said volatilizable metals, which iron compounds are reduced to iron during said second step, and recovering volatilizable metals from the waste gases.

2. A process according to claim 1 characterized by said volatilizable metals comprising lead and zinc.

3. A process according to claim 1 characterized by the step of introducing a portion of said ores and waste materials directly into said second process step.

4. A process according to claim 1 characterized in that said ores and waste materials comprise a fine-grained portion, which portion is introduced directly into said second process step.

5. A process for separating iron from metals accompanying iron in ores and waste materials, which accompanying metals are volatilizable during the reduction of iron, comprising a first step of smelting the ores and waste materials in a blast furnace to form pig iron, a second step of reducing a charge comprising the flue dusts from said blast furnace step and sludge obtained from said flue dusts, which flue dusts and sludge contain compounds of iron as well as said volatilizable metals, in a rotary kiln, thereby reducing said iron compounds to iron under the formation of slag and waste gases and expelling said volatilizable metals in said waste gases containing said volatilizable metals from said kiln, and the step of recovering said volatilizable metals from said waste gases.

6. A process according to claim 5 characterized by adding, at will, admixtures of from a high silicic acid to a high basic content to said charge to be treated by said second step in order to obtain a slag of a determined composition.

7. A process for separating iron from metals accompanying iron in ores and waste materials, which accompanying metals are volatilizable during the reduction of iron, comprising a first step of smelting the ores and waste material in a blast furnace to form pig iron, and a second step of reducing a charge comprising the flue dusts from said blast furnace step and sludge obtained from said flue dusts, in a rotary kiln, by the direct smelting of a charge containing ferriferous ores mixed with reducing agents and introduced into one end of said kiln and air at the opposite end of said kiln by preheating, reduction to iron sponge and lumping of the iron sponge in the dammed up charge adjacent said opposite kiln end, said flue dusts and sludge containing compounds of iron as well as of said volatilizable metals, which iron compounds are reduced to iron during said second step, said volatilizable metals being subsequently recovered from the waste gases of said second step by methods known per se.

8. A process for separating iron from metals accompanying iron in ores and waste materials, which accompanying metals are volatilizable during the reduction of iron, comprising a first step of smelting the ores and waste material in a blast furnace to form pig iron, and a second step of reducing a charge comprising the flue dusts from said blast furnace step and sludge obtained from said flue dusts, in a rotary kiln, said flue dusts and sludge containing compounds of iron as well as of said volatilizable metals, which iron compounds are reduced to iron during said second step, introducing difficultly reducible materials into said second step together with said flue dusts and sludge obtained from the latter, and recovering volatilizable metals from the waste gases.

9. A process as described in claim 8, characterized in that said difficultly reducible materials are roasted pyrites.

References Cited in the file of this patent

UNITED STATES PATENTS

| 1,431,877 | Diehl | Oct. 10, 1922 |
| 1,517,232 | Diehl | Nov. 25, 1924 |
| 1,789,932 | Smaill | Jan. 20, 1931 |
| 2,011,400 | Eulenstein | Aug. 13, 1935 |
| 2,373,244 | Holz | Apr. 10, 1945 |
| 2,598,743 | Waring et al. | June 3, 1952 |
| 2,631,178 | Morton | Mar. 10, 1953 |

FOREIGN PATENTS

| 480,566 | Great Britain | Feb. 24, 1938 |